(12) United States Patent
Li

(10) Patent No.: US 6,619,820 B2
(45) Date of Patent: Sep. 16, 2003

(54) LIGHT CONDENSING AND COLLECTING SYSTEMS USING LENSED LIGHT PIPES

(75) Inventor: Kenneth K. Li, Arcadia, CA (US)

(73) Assignee: Cogent Light Technologies, Inc., Santa Clarita, CA (US)

(*) Notice: Subject to any disclaimer, the term of this patent is extended or adjusted under 35 U.S.C. 154(b) by 51 days.

(21) Appl. No.: 09/955,980

(22) Filed: Sep. 20, 2001

(65) Prior Publication Data

US 2002/0039293 A1 Apr. 4, 2002

Related U.S. Application Data

(60) Provisional application No. 60/234,168, filed on Sep. 20, 2000.

(51) Int. Cl.[7] ................................................. F21V 7/09
(52) U.S. Cl. ....................... 362/302; 362/299; 362/305; 362/551
(58) Field of Search ................................ 362/299, 302, 362/305, 551, 554, 583, 560, 580, 298, 558, 304, 308

(56) References Cited

U.S. PATENT DOCUMENTS

| 4,757,431 A | 7/1988 | Cross et al. |
| 5,191,393 A | 3/1993 | Hignette et al. |
| 5,414,600 A | * 5/1995 | Strobl .................. 362/298 |
| 5,430,634 A | 7/1995 | Baker et al. |
| 5,836,667 A | 11/1998 | Baker et al. |
| 5,857,041 A | 1/1999 | Riser et al. |

FOREIGN PATENT DOCUMENTS

| EP | 0 864 897 A2 | 9/1998 |
| GB | 2 201 527 A | 9/1988 |

* cited by examiner

Primary Examiner—Sandra O'Shea
Assistant Examiner—Bao Truong
(74) Attorney, Agent, or Firm—Rothwell, Figg, Ernst & Manbeck, PC

(57) ABSTRACT

An optical coupling element for use in large numerical aperture collecting and condensing systems. The optical coupling element includes a lens having a curved surface and a tapered light pipe. The curved surface reduces the angle of incidence of the light striking the input end of the optical coupling element such that the Fresnel reflection is greatly reduced. Electromagnetic radiation emitted by a source is collected and focused onto a target by positioning the source of electromagnetic radiation at a first focal point of a first reflector so that the source produces rays of radiation reflected from the first reflector that converge at a second focal point of the second reflector. The optical coupling element is positioned so that a center of the lens is substantially proximate with the second focal point of the second reflector and the curved surface is between the second reflector and the center. The converging rays of radiation reflected from the second reflector pass through the curved surface of the lens and reach the center.

30 Claims, 9 Drawing Sheets

LIGHT CONDENSING AND COLLECTING SYSTEMS USING LENSED LIGHT PIPES

CROSS-REFERENCE TO RELATED APPLICATIONS

This application claims priority to Provisional Application Serial No. 60/234,168, filed Sep. 20, 2000, the disclosure of which is incorporated by reference.

BACKGROUND OF THE INVENTION

1. Field of the Invention

This invention relates to illumination and projection systems that collect and condense light spread over a wide collection angle to a small target.

2. Description of the Related Art

The objective of systems that collect, condense, and couple electromagnetic radiation into a target such as a standard waveguide, e.g. a single fiber or fiber bundle, or output electromagnetic radiation to the homogenizer of a projector, is to maximize the brightness of the electromagnetic radiation at the target. There are several common systems for collecting and condensing light from a lamp for such illumination and projection applications.

U.S. Pat. No. 4,757,431 ("the '431 patent"), the disclosure of which is incorporated by reference, describes a light condensing and collecting system employing an off-axis spherical concave reflector to enhance the flux illuminating a small target/and the amount of collectable flux density reaching the small target. Another light condensing and collecting system is provided by U.S. Pat. No. 5,414,600 ("the '600 patent"), the disclosure of which is incorporated by reference, describes the use of an ellipsoid concave reflector. Similarly, U.S. Pat. No. 5,430,634 ("the '634 patent"), the disclosure of which is incorporated by reference, describes the use of a toroid concave reflector.

The systems of the '431, the '600 and the '634 patents provide a near 1:1 (unit magnification) image and conserve brightness from the light source. However, these systems lose their 1:1 (unit) magnification, thus degrading overall projection system performance, as the collection angle of the reflector is raised to increase the amount of collected light. Therefore, in these systems, increasing the collection efficiency decreases the quality of the produced image.

To address problems in the known optical collection and condensing systems, U.S. patent application Ser. No. 09/604,921, the disclosure of which is incorporated by reference, provides a dual-paraboloid reflector system that is advantageous in many respects to other known systems, including the achievement of 1:1 magnification for small-sized light sources.

This optical collection and condensing system, as illustrated in FIG. 1(a), uses two generally symmetric paraboloid reflectors 10, 11 that are positioned so that light reflected from the first reflector 10 is received in a corresponding section of the second reflector 11. In particular, light emitted from a light source 12, such as an arc lamp, is collected by the first parabolic reflector 10 and collimated along the optical axis toward the second reflector 11. The second reflector 11 receives the collimated beam of light and focuses this light at the target 13 positioned at the focal point.

To facilitate the description of this optical system, FIG. 1 includes the light paths for four different rays (a, b, c and d) emitted from the light source 12. The light output from an arc lamp subtends a cone angle of about 90° when viewed in a direction normal to the lamp axis, as shown in FIG. 1(a). The light output from an arc lamp subtends a cone angle of nearly 180° when viewed in a direction parallel to the lamp axis, as shown in FIG. 1(b). Rays a and d indicate the extents of the cone angle.

The optical system of FIG. 1 may employ a retro-reflector 14 in conjunction with the first paraboloid reflector 10 to capture radiation emitted by the light source 12 in a direction away from the first paraboloid reflector 10 and reflect the captured radiation back through the light source 12. In particular, the retro-reflector 14 has a generally spherical shape with a focus located substantially near the light source 12 (i.e., at the focal point of the first paraboloid reflector) toward the first paraboloid reflector to thereby increase the intensity of the collimated rays reflected therefrom.

One shortcoming of the above described dual-paraboloid optical system is that a large input angle is produced, resulting in numerical apertures as high as 1.0. As a result, some of the rays strike the target 13 at high angles of incidence relative to the target surface. Such high angles of incidence produce Fresnel reflections that introduce losses.

In U.S. application Ser. No. 09/669,841, the disclosure of which is incorporated by reference, a dual ellipsoidal reflector system is described as providing 1:1 magnification for small light source target. This optical collection and condensing system, as illustrated in FIG. 2, uses two generally symmetric ellipsoid reflectors 20, 21 that are positioned so that light reflected from the first reflector 20 is received in a corresponding section of the second reflector 21. In particular, light emitted from the light source 22 is collected by the first elliptical reflector 20 and focused onto the optical axis 25 and diverged toward the second reflector 21. The second reflector 21 receives the divergent beam of light and focuses this light at the target 23 positioned at the focal point.

As may be seen in FIG. 2, the dual-ellipsoid system suffers from the same disadvantage as the dual-paraboloid system in that some rays strike the target at large angles of incidence, producing Fresnel reflections. But as with the systems described above, Fresnel reflections caused by the large collection angle introduce losses.

Another embodiment of the dual-ellipsoid system may be seen in FIG. 3. This dual-ellipsoid system suffers from the same disadvantage as the above-mentioned dual-paraboloid and dual-ellipsoid systems in that some rays strike the target at large angles of incidence, also producing Fresnel reflections.

A tapered light pipe 40 with a flat input surface 42 for use with the above systems is shown in FIG. 4. Rays of light a', b', c', and d' reflected by second reflector 41 converge at flat surface 42 of tapered light pipe 40 at large angles of incidence as shown in FIG. 4. The tapering of light pipe 40 will transform the large input angles into smaller output angles. The degree to which the angles are transformed will depend on the degree of taper. The output angles are designed for a specific system by matching the output device to the light pipe. As shown in FIG. 4, the input angle at input surface 42 of the light pipe 40 between rays a' and d' can approach 180 degrees, i.e. an angle of incidence of 90 degrees. Such a high angle of incidence will introduce high losses due to Fresnel reflections. For uncoated light pipes made with glass or quartz, the Fresnel reflection loss becomes very significant at angles of incidence larger than about 75 degrees.

Therefore, there remains a need to provide a method of coupling light from a small source to illumination and projection systems with reduced losses due to Fresnel reflections.

SUMMARY

An optical coupling element for use in large numerical aperture collecting and condensing systems. The optical coupling element includes a lens with a center and a curved surface. The optical coupling element is placed substantially at the input end of a fiber, fiber bundle, or homogenizer. The curved surface reduces the angle of incidence of the light striking the input end of the optical coupling element such that the Fresnel reflection is greatly reduced.

In particular, a collecting and condensing system comprises a source of electromagnetic radiation, and an optical coupling element to be illuminated with at least a portion of the electromagnetic radiation emitted by the source. The optical coupling element comprises a lens and a tapered light pipe, the lens having a center and a curved surface distributed about the center. A first reflector having a first optical axis and a first focal point is arranged facing substantially symmetrically a second reflector having a second optical axis and a second focal point on the optical axis, such that the first and second optical axes are substantially collinear. The source is located substantially proximate to the first focal point of the first reflector to produce rays of radiation that are reflected by the first reflector towards the second reflector, converging substantially at the second focal point. The center of the lens is located substantially proximate to the second focal point of the second reflector, and the curved surface is disposed substantially between the center and the second reflector to collect the electromagnetic radiation and transmit it to the tapered light pipe.

Electromagnetic radiation emitted by a source of electromagnetic radiation is collected and focused onto a target by positioning the source of electromagnetic radiation at a focal point of a first reflector so that the first reflector produces rays of radiation reflected from the first reflector that converge substantially at a focal point of the second reflector. A substantially hemispherical or toroidal optical coupling element is positioned so that a center of the optical coupling element is substantially proximate with the focal point of the second reflector, whereby the converging rays of radiation reflected from the second reflector pass through a substantially curved surface of the optical coupling element and toward the focal point of the second reflector.

The above and other features and advantages of the present invention will be further understood from the following description of the preferred embodiments thereof, taken in conjunction with the accompanying drawings.

BRIEF DESCRIPTION OF THE DRAWINGS

FIG. 1(*b*) is a detail of the lamp and the first reflector of the embodiment shown in FIG. 1(*a*), viewed along the reflector axis;

FIG. 6(*b*) is a detail of the optical coupling element of the embodiment shown in FIG. 6(*a*), viewed along the reflector axis.

DETAILED DESCRIPTION OF THE PREFERRED EMBODIMENTS

Figure 1A:
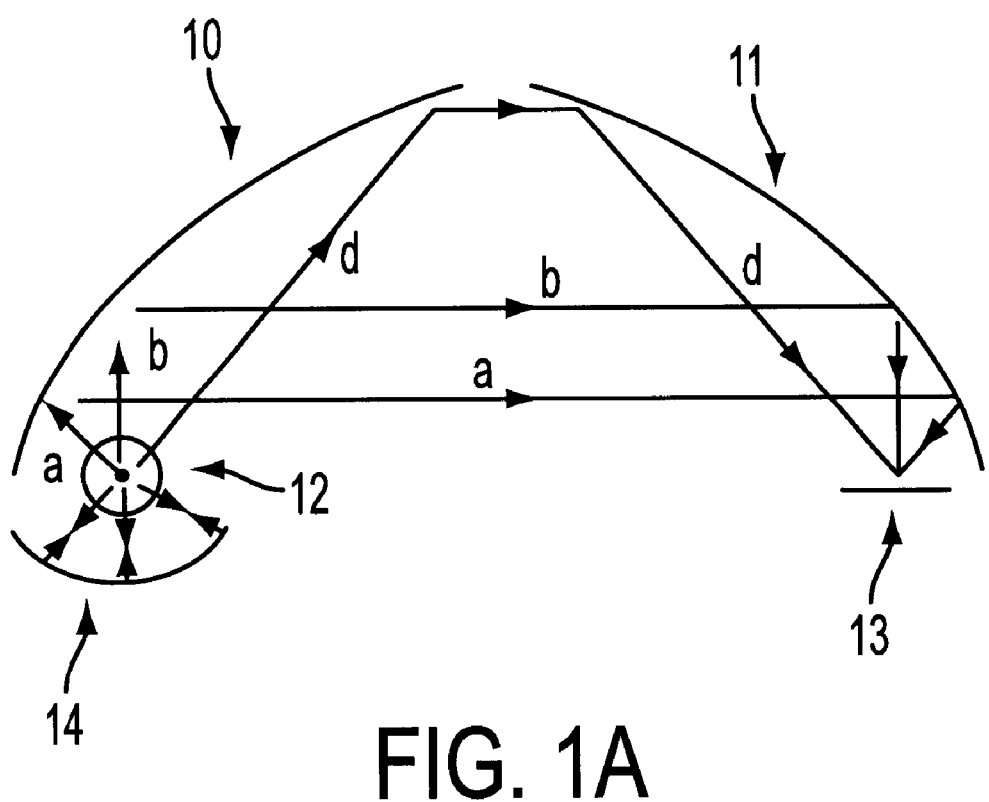
FIG. 1(*a*) is a schematic diagram of a collecting and condensing system for use with an embodiment of the invention.
Figure 1B:
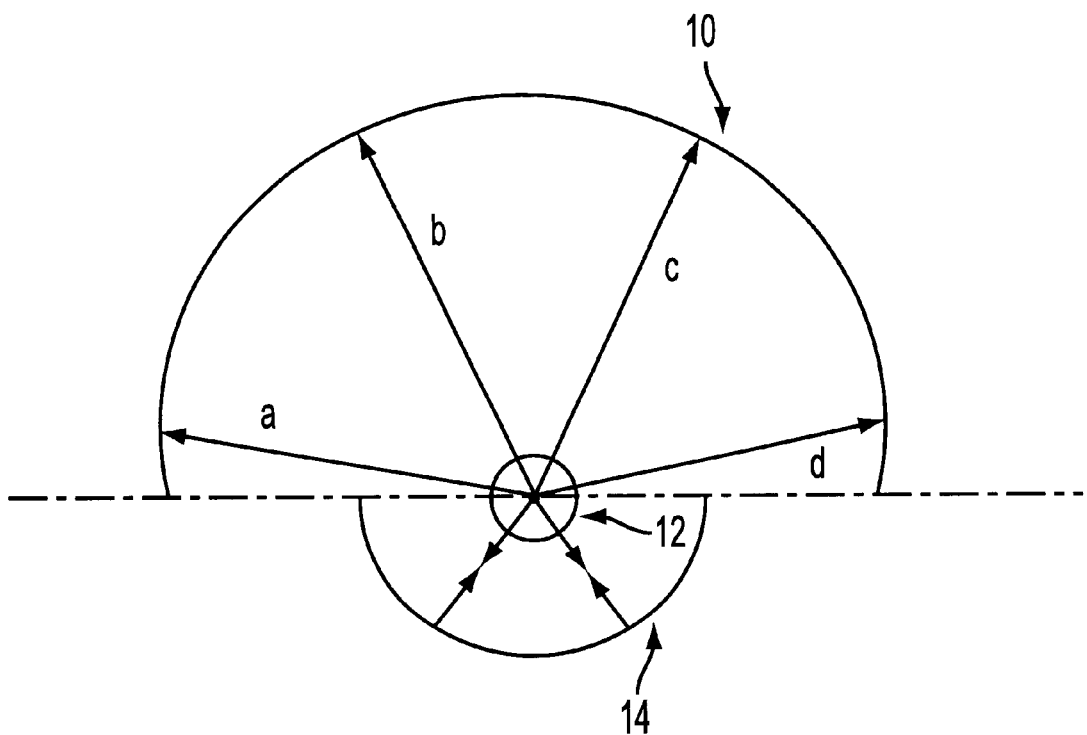
Figure 2:
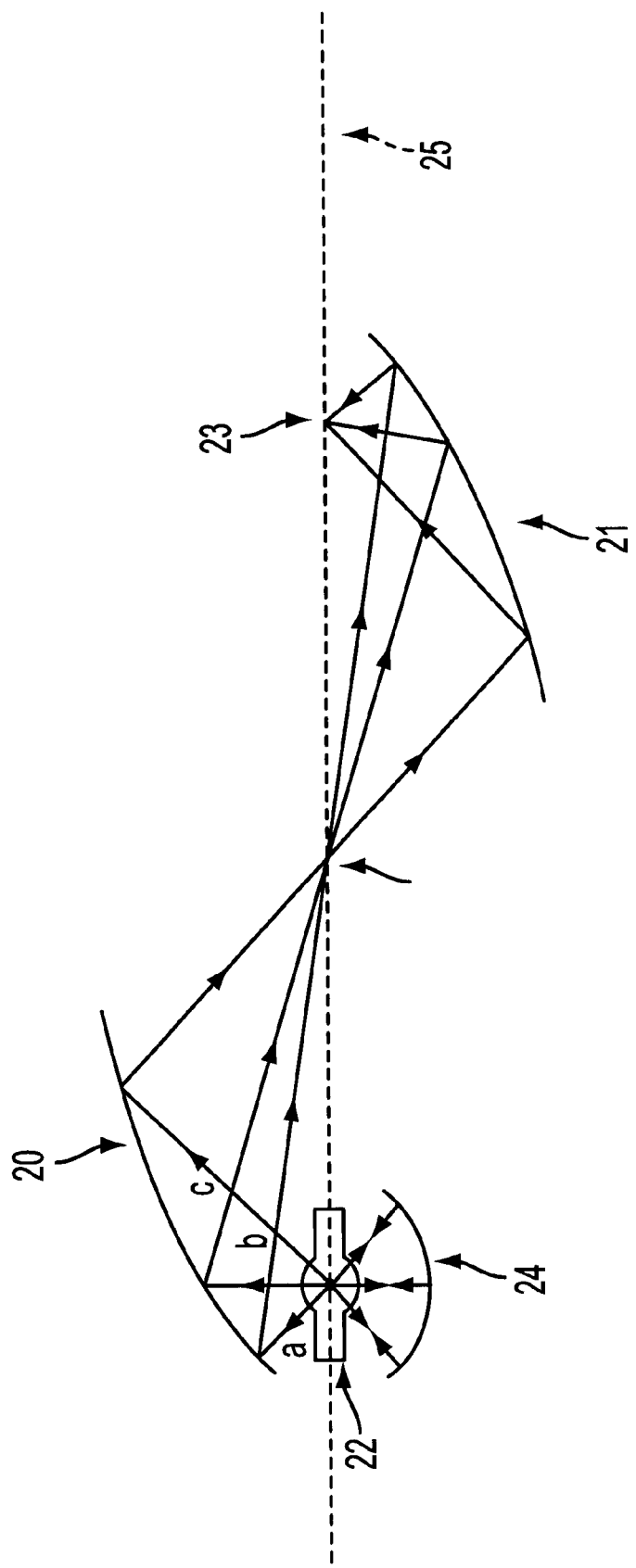
FIG. 2 is a schematic diagram of a collecting and condensing system for use with an embodiment of the invention.
Figure 3:
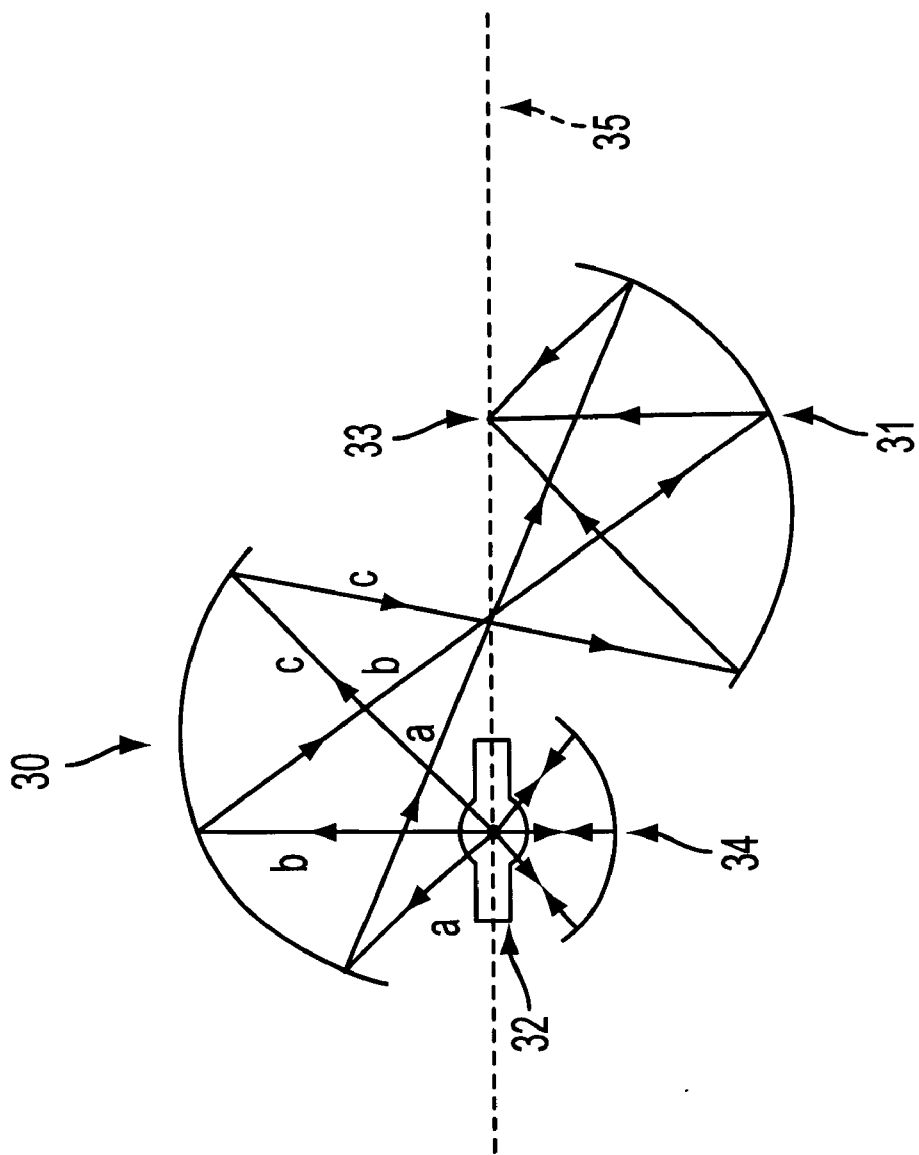
FIG. 3 is a schematic diagram of a variation of the collecting and condensing system shown in FIG. 2.
Figure 4:
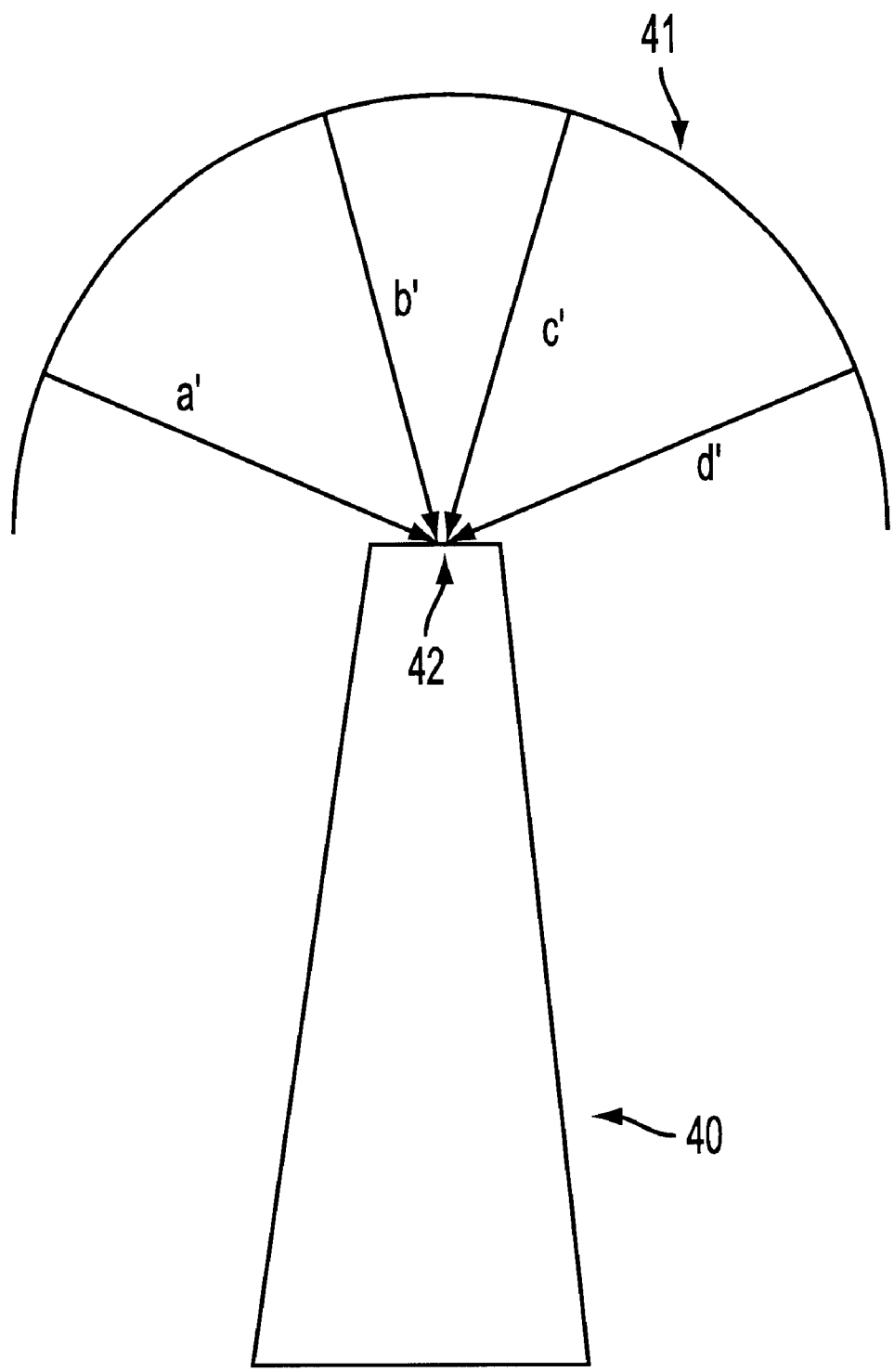
FIG. 4 is a schematic diagram of a conventional tapered light pipe.
Figure 5:
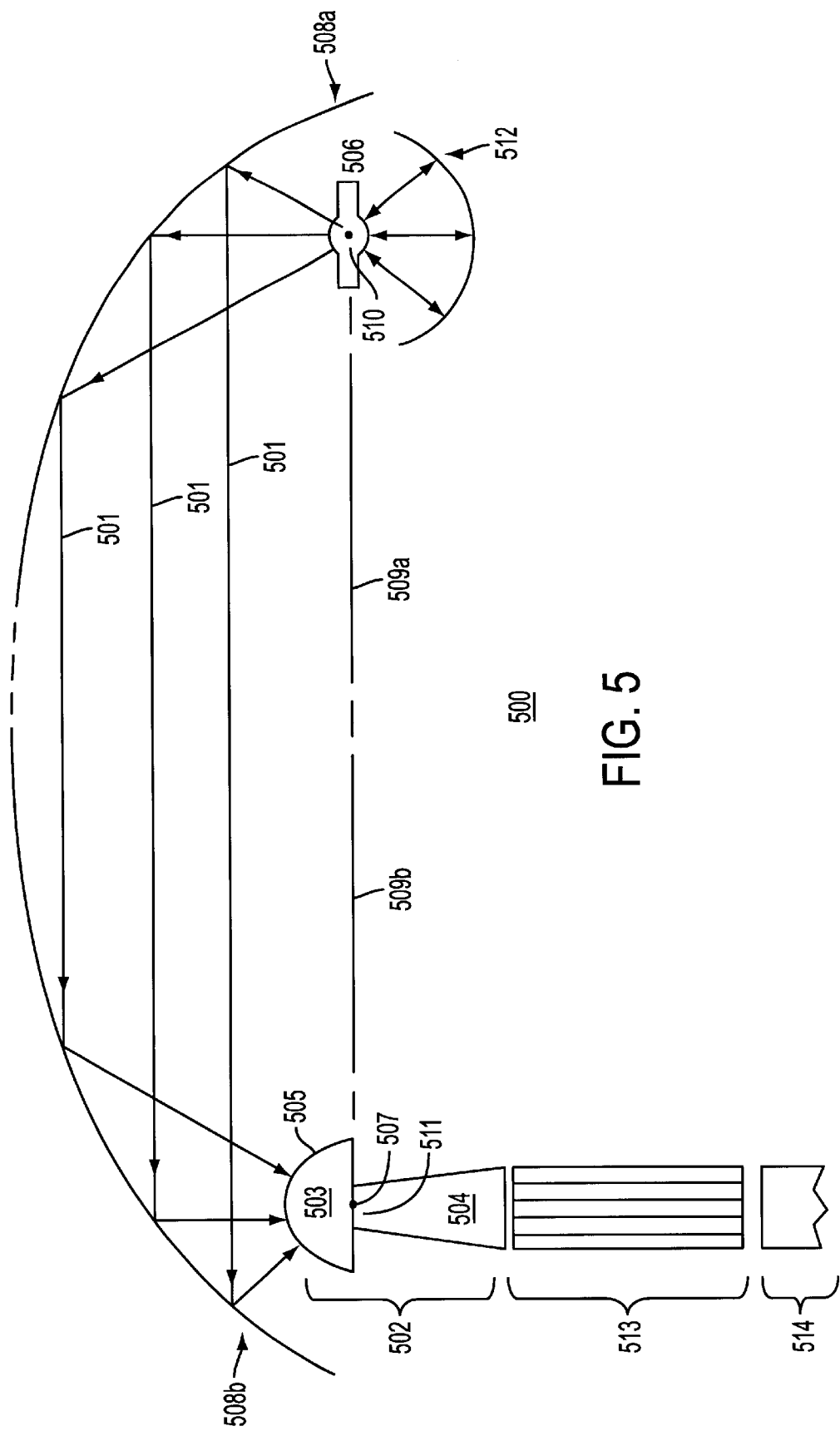
FIG. 5 is a schematic diagram of a tapered light pipe with a hemispherical lens at the input of the light pipe according to an embodiment of the invention.

In FIG. 5 is shown a collecting and condensing system 500 used to launch electromagnetic radiation 501 into an optical coupling element 502 composed of a lens 503 attached to a tapered light pipe 504, whose cross-section could be circular, square, rectangular, or, in general, a polygon.

In particular, the collecting and condensing system 500 has a source 506 of electromagnetic radiation 501 and an optical coupling element 502 to be illuminated with at least a portion of the electromagnetic radiation 501 emitted by the source 506. Lens 503 has a center 507 and a curved surface 505 distributed about center 507. First reflector 508*a* having a first optical axis 509*a* and a first focal point 510 on the first optical axis 509*a* is arranged around source 506, so that source 506 is located substantially proximate to first focal point 510 of reflector 508*a*. Second reflector 508*b* having a second optical axis 509*b* and a second focal point 511 on the second optical axis 509*b* is arranged substantially symmetrically to first reflector 508*a*. First optical axis 509*a* is substantially collinear with second optical axis 509*b*.

Source 506 produces rays of electromagnetic radiation 501 that are reflected by first reflector 508*a* toward second reflector 508*b*, and thence converge substantially at second focal point 511. Center 507 is located substantially proximate to second focal point 511 of second reflector 508*b*, and curved surface 505 is disposed substantially between center 507 and second reflector 508*b* to collect electromagnetic radiation 501. In one embodiment, curved surface 505 is substantially aspherical. In another embodiment, curved surface 505 is substantially radially distributed about said center 507. In a third embodiment, curved surface 505 is substantially toroidal. In a preferred embodiment, lens 503 is substantially a hemisphere.

The large angle light with respect to the optical coupling element 502 will impinge the curved surface 505 of the lens 503 approximately normal to the curved surface 505. The spot size at the curved surface 505 of the optical coupling element 502 will be thus be reduced relative to, e.g. a flat surface. Consequently, a smaller input end may be used. In the alternative, the large input surface area results in a higher threshold of power tolerance. For example, instead of using quartz, BK7 glass or another material with a lower melting point can be used for certain applications.

The taper transition of tapered light pipe 504 can be straight, or curved depending on the particular applications. The lens 503 and tapered light pipe 504 can be made in one piece, or made separately and assembled together. If the lens 503 and tapered light pipe 504 are separate pieces, the refractive indices between the lens 503 and the tapered light pipe 504 should be matched. Tapered light pipe 504 can be made with cladding or without. The output surface of tapered light pipe 504 can also be curved for proper matching to specific applications.

First and second reflectors 508*a* and 508*b* may be coated with a coating that reflects only a pre-specified portion of the electromagnetic radiation spectrum. For example, the coating may only reflect visible light radiation, a pre-specified band of radiation, or a specific color of radiation. First and second reflectors 508a and 508b may further be portions of a substantially ellipsoidal, toroidal, spheroidal, or paraboloidal surface of revolution.

In an alternate embodiment, an additional reflector 512 may be placed to reflect at least part of that portion of electromagnetic radiation 501 that does not impinge directly on first reflector 508a back toward first reflector 508a through the first focal point 510 of first reflector 508a to increase the flux intensity of the converging rays. In a preferred embodiment, additional reflector 512 is a spherical retro-reflector disposed on the side of source 506 opposite first reflector 508a to reflect electromagnetic radiation 501 emitted from source 506 in a direction away from first reflector 508a back toward first reflector 508a through first focal point 510 of first reflector 508a.

In one embodiment, source 506 is a light-emitting arc lamp. Source 506 may be, e.g., a xenon lamp, a metal halide lamp, an HID lamp, or a mercury lamp. In an alternative embodiment, source 506 is a filament lamp.

In one embodiment, the electromagnetic radiation 501 collected and condensed by optical coupling element 502 is coupled to a waveguide 513 such as a single core optic fiber, a fiber bundle, a fused fiber bundle, a polygonal rod, a hollow reflective light pipe, or a homogenizer. The cross-section of waveguide 513 may be circular, polygonal, tapered, or a combination thereof. Optical coupling element 502 and waveguide 513 may be made of a material such as quartz, glass, plastic, or acrylic.

In one embodiment, a fiber optic 514 is illuminated by the electromagnetic radiation 501 collected and condensed at optical coupling element 502 and/or waveguide 513. Fiber optic 514 transmits and releases the collected and condensed electromagnetic radiation 501 to provide illumination at a desired location.

Figure 6A:
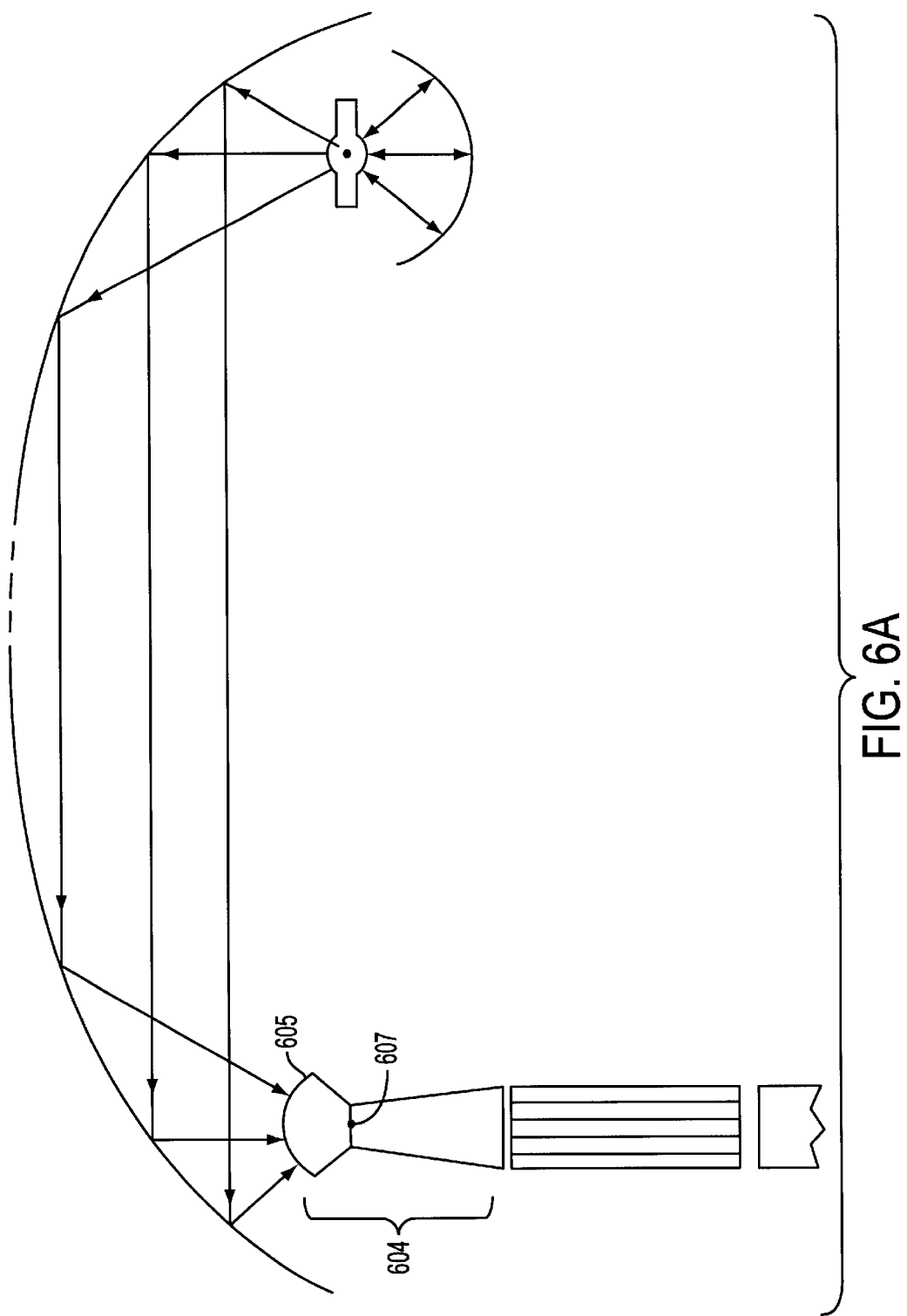
FIG. 6(*a*) is a schematic diagram of a tapered light pipe with a spherical lens connected to a block of optical glass according to an embodiment of the invention.
Figure 6B:
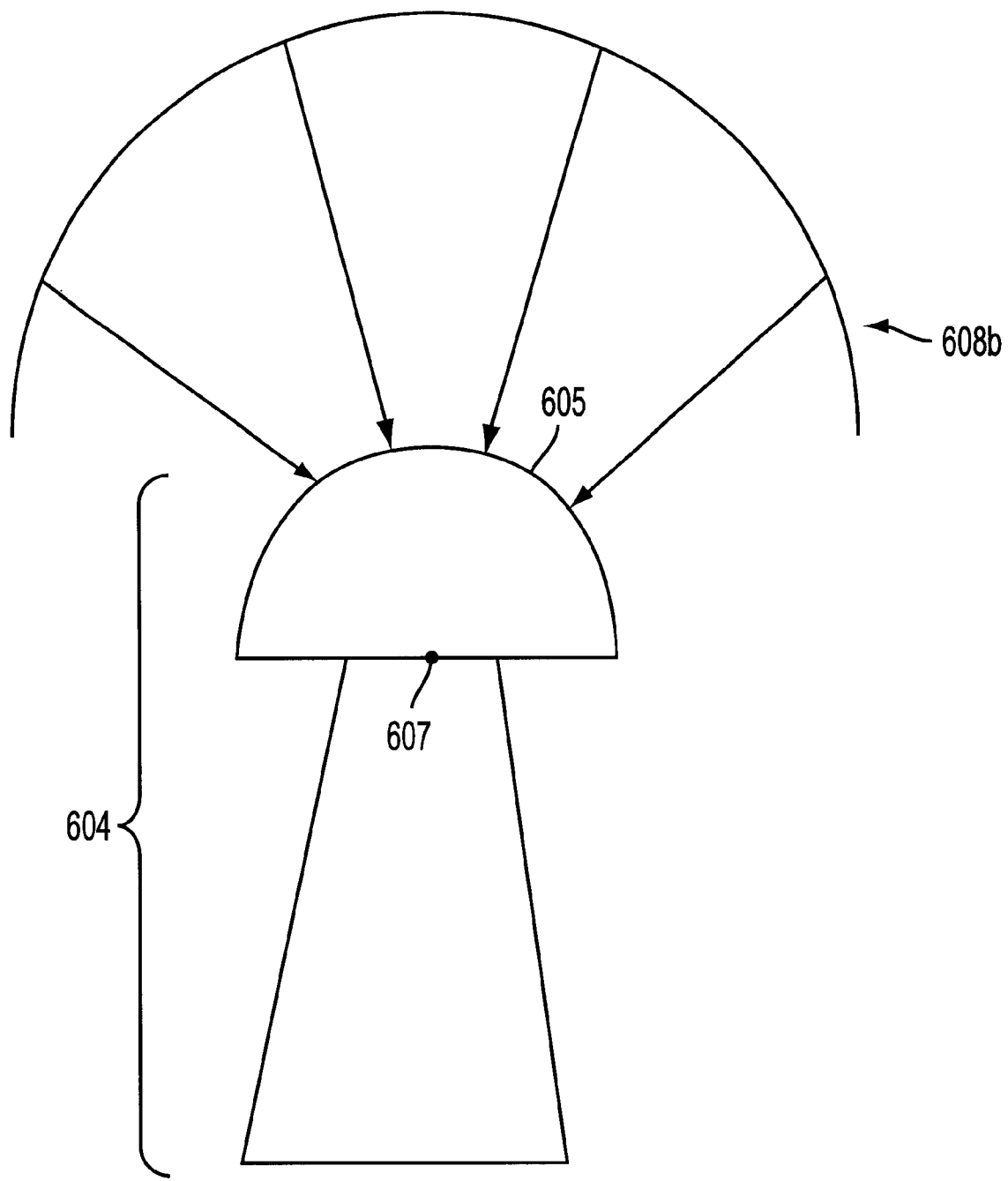

In FIG. 6 is shown an alternate embodiment of the invention. It consists of a truncated spherical surface 605 whose center of curvature 607 is located at the input end of tapered light pipe 604. The spherical surface 605 subtends an arc of 180° when viewed along the axis of the reflectors, as shown in FIG. 6(b), but subtends a smaller arc, e.g. 90°, when viewed in a direction normal to the optical axes of the reflectors, as shown in FIG. 6(a). The acceptance angle of spherical surface 605 thus approximately matches the emission angle of the lamp, which is about 180° when viewed along the optical axes of the reflectors, but is about 90° when viewed in a direction normal to the optical axes of the reflectors.

The embodiment shown in FIG. 6 is easier to manufacture than that shown in FIG. 5, since it requires less material, and requires a smaller surface made to optical quality. In a further refinement of the embodiment shown in FIG. 6, the spherical surface 605 may be modified to reduce aberration. For example, an aspheric surface or other appropriate surface can be used.

Figure 7:
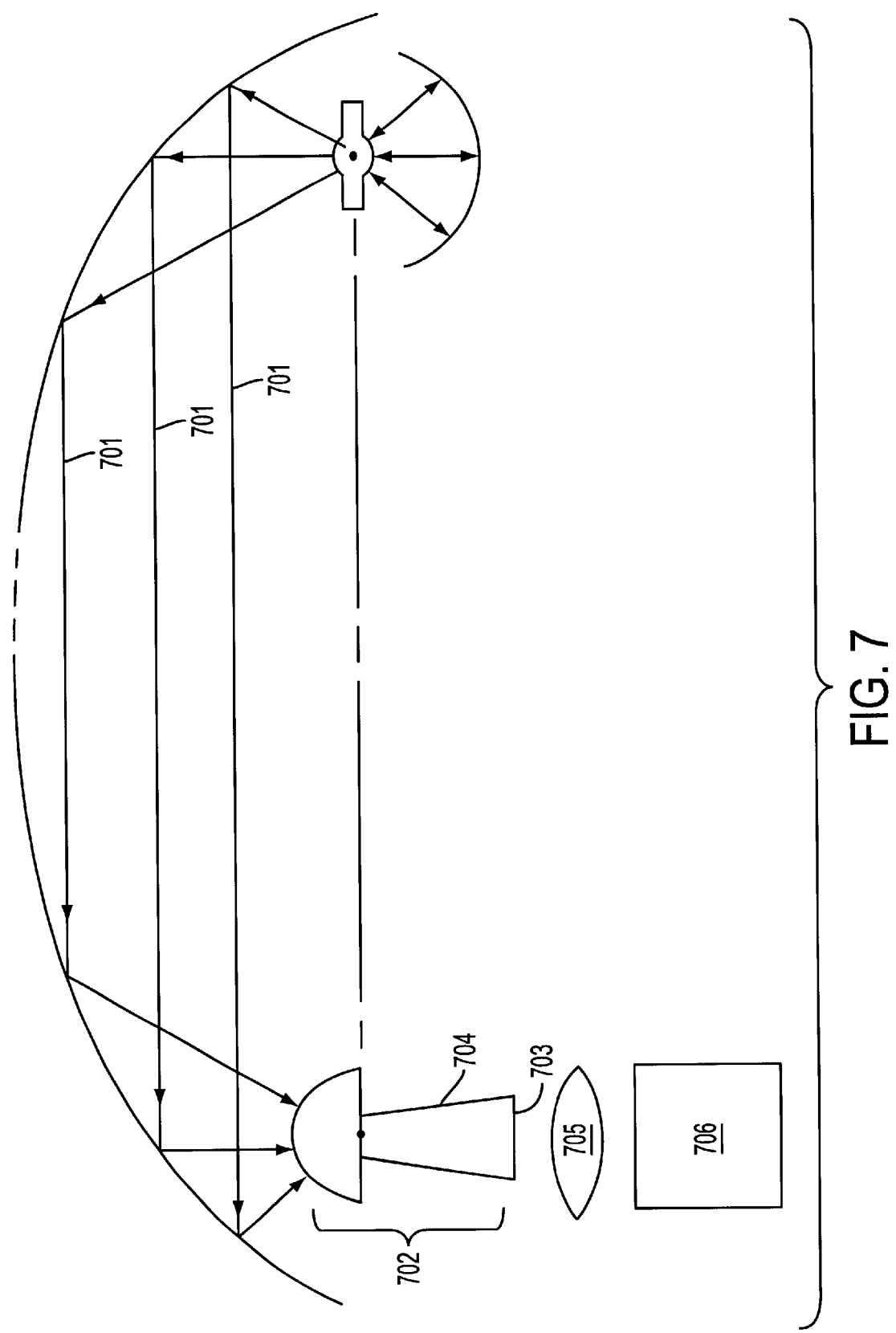
FIG. 7 is a schematic diagram of an embodiment of the invention for use with a projection system.

In FIG. 7 is shown a projection system for use with the embodiment of the invention shown in FIG. 5. A condenser lens 705 is placed substantially in series with the output end 703 of tapered light pipe 704. A projection system 706 placed substantially in series with condenser lens 705 is illuminated by the electromagnetic radiation collected and condensed at optical coupling element 702 and transferred though condenser lens 705. Projection system 706 transmits and releases the collected and condensed electromagnetic radiation 701 to project an image at a desired location.

A method for collecting electromagnetic radiation emitted by a source of electromagnetic radiation and focusing the collected radiation onto a target, according to an embodiment of, the invention, is as follows. A source of electromagnetic radiation is positioned at a focal point of a first reflector. Rays of radiation are produced by the source. The rays of radiation are reflected by the first reflector. The rays of radiation are converged at a focal point of the second reflector. A substantially hemispherical optical coupling element is positioned so that its center is substantially proximate to the focal point of the second reflector. The rays of radiation reflected by the reflector are passed through a substantially curved surface of the optical coupling element and toward the focal point of the second reflector.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A collecting and condensing system comprising:
   a source of electromagnetic radiation;
   an optical coupling element to be illuminated with at least a portion of the electromagnetic radiation emitted by said source, said optical coupling element comprising a lens and a tapered light pipe, said lens having a center and a curved surface distributed about said center;
   a first reflector having a first optical axis and a first focal point on said first optical axis;
   a second reflector having a second optical axis and a second focal point on said second optical axis disposed substantially symmetrically to said first reflector such that said first optical axis is collinear with said second optical axis;
   said source being located proximate to said first focal point of said first reflector to produce rays of radiation that reflect from said first reflector to said second reflector and substantially converge at said second focal point; and
   wherein said center is located proximate to said second focal point of said second reflector, and said curved surface is disposed between said center and said second reflector to collect said electromagnetic radiation.

2. The collecting and condensing system of claim 1 wherein said curved surface is substantially aspherical.

3. The collecting and condensing system of claim 1 wherein said curved surface is substantially radially distributed about said center.

4. The collecting and condensing system of claim 1 wherein said lens is a hemisphere.

5. The collecting and condensing system of claim 1 wherein said first and second reflectors have a coating that reflects only a pre-specified portion of the electromagnetic radiation spectrum.

6. The collecting and condensing system of claim 5, wherein said coating only reflects visible light radiation, a pre-specified band of radiation, or a specific color of radiation.

7. The collecting and condensing system of claim 1, wherein said first and second reflectors comprise at least a portion of a substantially ellipsoidal surface of revolution.

8. The collecting and condensing system of claim 1, wherein said first and second reflectors comprise at least a portion of a substantially toroidal surface of revolution.

9. The collecting and condensing system of claim 1, wherein said first and second reflectors comprise at least a portion of a substantially spheroidal surface of revolution.

10. The collecting and condensing system of claim 1, wherein said first and second reflectors comprise at least a portion of a substantially paraboloidal surface of revolution.

11. The collecting and condensing system of claim 1, wherein a portion of the electromagnetic radiation emitted by said source of electromagnetic radiation impinges directly on said first reflector and a portion of the electromagnetic radiation does not impinge directly on said first reflector and wherein said system further comprises an additional reflector constructed and arranged to reflect at least part of the portion of the electromagnetic radiation that does not impinge directly on said first reflector toward said first reflector through the first focal point of said first reflector to increase the flux intensity of the converging rays.

12. The collecting and condensing system of claim 11, wherein said additional reflector comprises a spherical retro-reflector disposed on a side of said source opposite said first reflector to reflect electromagnetic radiation emitted from said source in a direction away from said first reflector toward said first reflector through the first focal point of said first reflector.

13. The collecting and condensing system of claim 1, wherein said source comprises a light-emitting arc lamp.

14. The collecting and condensing system of claim 13, wherein said arc lamp comprises a lamp selected from the group comprising a xenon lamp, a metal halide lamp, an HID lamp, or a mercury lamp.

15. The collecting and condensing system of claim 1, wherein said source comprises a filament lamp.

16. The collecting and condensing system of claim 1, wherein said optical coupling element further comprises a waveguide selected from the group comprising a single core optic fiber, a fiber bundle, a fused fiber bundle, a polygonal rod, a hollow reflective light pipe, or a homogenizer.

17. The collecting and condensing system of claim 16 wherein a cross-section of said waveguide is selected from the group consisting of circular waveguides, polygonal waveguides, tapered waveguides and combinations thereof.

18. The collecting and condensing system of claim 1 wherein said optical coupling element comprises a material selected from the group consisting of quartz, glass, plastic, or acrylic.

19. The collecting and condensing system of claim 1 further comprising a fiber optic, the fiber optic being illuminated by the radiation collected and condensed at said optical coupling element, the fiber optic releasing the collected and condensed radiation to provide for illumination at a desired location.

20. The collecting and condensing system of claim 1 further comprising:
a condenser lens disposed proximate to an output end of said tapered light pipe;
an image projection system disposed proximate to an output side of said condenser lens;
an image being illuminated by the radiation collected and condensed at said optical coupling element, the projection system releasing the collected and condensed radiation to display the image.

21. An optical device for collecting electromagnetic radiation emitted by a source of electromagnetic radiation and focusing the collected radiation onto an optical coupling element, said device comprising:
a source of electromagnetic radiation;
an optical coupling element to be illuminated with at least a portion of the electromagnetic radiation emitted by said source, said optical coupling element comprising a lens and a tapered light pipe, said lens having a center and a curved surface distributed about said center;
a first reflector having a first optical axis and a first focal point on said first optical axis;
a second reflector having a second optical axis and a second focal point on said second optical axis disposed substantially symmetrically to said first reflector such that said first optical axis is collinear with said second optical axis;
said source being located proximate to said first focal point of said first reflector to produce rays of radiation that reflect from said first reflector to said second reflector and substantially converge at said second focal point; and
wherein said center is located proximate to said second focal point of said second reflector, and said curved surface is disposed between said center and said second reflector to collect said electromagnetic radiation.

22. The optical device of claim 21, further comprising an additional reflector constructed and arranged to reflect at least part of a portion of electromagnetic radiation emitted by the source that does not impinge directly on said first reflector toward said first reflector through the first focal point of said first reflector to increase the flux intensity of the converging rays.

23. The optical device of claim 22, wherein said additional reflector comprises a spherical retro-reflector disposed on a side of the source opposite said first reflector to reflect electromagnetic radiation emitted from the source in a direction away from said first reflector toward said first reflector through the first focal point of said first reflector.

24. The optical device of claim 21, wherein said first and second reflectors comprise at least a portion of a substantially ellipsoid surface of revolution.

25. The optical device of claim 21, wherein said first and second reflectors comprise at least a portion of a substantially toroidal surface of revolution.

26. The optical device of claim 21, wherein said first and second reflectors comprise at least a portion of a substantially spheroidal surface of revolution.

27. The optical device of claim 21, wherein said first and second reflectors comprise at least a portion of a substantially paraboloidal surface of revolution.

28. A method for collecting electromagnetic radiation emitted by a source of electromagnetic radiation and focusing the collected radiation onto a target, the method comprising the steps of:
positioning said source of electromagnetic radiation at a focal point of a first reflector;
producing rays of radiation by said source;
reflecting said rays of radiation by said first reflector toward a second reflector;
converging said rays of radiation at a focal point of said second reflector;
positioning an optical coupling element comprising a lens and a tapered light pipe, said lens having a center and a substantially curved surface distributed about said center, so that said center of said lens is substantially proximate to the focal point of the second reflector;
passing the rays of radiation reflected by said second reflector through said substantially curved surface of said lens and toward the second focal point of said second reflector.

29. A method for collecting electromagnetic radiation emitted by a source of electromagnetic radiation and focusing the collected radiation onto a target, the method comprising the steps of:

positioning said source of electromagnetic radiation at a focal point of a first reflector;

producing rays of radiation by said source;

reflecting said rays of radiation by said first reflector toward a second reflector;

converging said rays of radiation at a focal point of said second reflector;

positioning a substantially hemispherical optical coupling element so that a center of said optical coupling element is substantially proximate to the focal point of the second reflector;

passing the rays of radiation reflected by said second reflector through a substantially curved surface of said optical coupling element and toward the second focal point of said second reflector;

wherein said first and second reflectors comprise at least a portion of a substantially paraboloidal surface of revolution.

30. The method for collecting electromagnetic radiation of claim 28, wherein said first and second reflectors comprise at least a portion of a substantially ellipsoidal surface of revolution.

* * * * *